(12) United States Patent
Folke

(10) Patent No.: US 10,793,365 B2
(45) Date of Patent: Oct. 6, 2020

(54) CONVEYOR DEVICE FOR THE SUSPENDED CONVEYANCE OF CONVEYABLE GOODS BY MEANS OF NEGATIVE PRESSURE

(71) Applicant: Heinrich Georg GmbH Maschinenfabrik, Kreuztal (DE)

(72) Inventor: Thomas Folke, Netphen (DE)

(73) Assignee: HEINRICH GEORG GMBH MASCHINENFABRIK, Kreutztal (DE)

( * ) Notice: Subject to any disclaimer, the term of this patent is extended or adjusted under 35 U.S.C. 154(b) by 0 days.

(21) Appl. No.: 15/618,796

(22) Filed: Jun. 9, 2017

(65) Prior Publication Data

US 2017/0355528 A1 Dec. 14, 2017

(30) Foreign Application Priority Data

Jun. 10, 2016 (EP) ..................................... 16173993

(51) Int. Cl.
*B65G 21/20* (2006.01)
*B65G 15/64* (2006.01)
*B65G 23/06* (2006.01)

(52) U.S. Cl.
CPC ......... *B65G 21/2036* (2013.01); *B65G 15/64* (2013.01); *B65G 21/2018* (2013.01); *B65G 23/06* (2013.01); *B65G 2201/022* (2013.01)

(58) Field of Classification Search
CPC ........................ B65G 21/2027; B65G 21/2036
(Continued)

(56) References Cited

U.S. PATENT DOCUMENTS 3,799,541 A    3/1974  Buccicone
4,295,737 A  * 10/1981  Silverberg ........... G03B 27/625
                                                       198/689.1
(Continued)

FOREIGN PATENT DOCUMENTS

CN       203624571 U    6/2014
DE        29721889 U1   2/1998
(Continued)

OTHER PUBLICATIONS

European Patent Office, European Search Report, Application No. 16173993.3, dated Dec. 15, 2016.
(Continued)

*Primary Examiner* — William R Harp
(74) *Attorney, Agent, or Firm* — Quarles & Brady LLP

(57) ABSTRACT

A conveyor device for the suspended conveyance of conveyable goods using negative pressure, comprising a continuous conveyor belt guided along a negative-pressure chamber with a rearward side facing towards the negative-pressure chamber. A contact side of the conveyor belt is provided with suction openings formed between the rearward side and the contact side of the conveyor belt. A recess extending in the longitudinal direction of the conveyor belt and limited by longitudinal edges of the conveyor belt is formed on the contact side such that a suction duct sealed by the longitudinal edges and arranged transversely to the longitudinal direction of the conveyor belt with respect to the contact side of the conveyable goods is formed between the contact side of the conveyor belt and the contact side of the conveyable goods.

16 Claims, 5 Drawing Sheets

(58) Field of Classification Search
USPC .................................................. 198/689.1
See application file for complete search history.

(56) References Cited

U.S. PATENT DOCUMENTS

| | | | | |
|---|---|---|---|---|
| 5,234,097 | A * | 8/1993 | Okuyama | B29D 30/3007 |
| | | | | 198/434 |
| 5,475,917 | A * | 12/1995 | Biagiotti | B26D 3/16 |
| | | | | 198/428 |
| 5,695,043 | A * | 12/1997 | Maezuru | B65G 15/32 |
| | | | | 198/689.1 |
| 5,829,740 | A | 11/1998 | Kerpe et al. | |
| 6,102,191 | A * | 8/2000 | Janzen | B65G 21/2018 |
| | | | | 198/689.1 |
| 8,931,625 | B2 * | 1/2015 | Balbi | B65G 21/2036 |
| | | | | 198/689.1 |
| 2012/0067701 | A1 * | 3/2012 | Steffen | B65G 21/2036 |
| | | | | 198/617 |
| 2015/0158673 | A1 | 6/2015 | Lenser | |
| 2017/0197792 | A1 * | 7/2017 | Alonso Ramila | B65G 21/2018 |

FOREIGN PATENT DOCUMENTS

| | | |
|---|---|---|
| DE | 102005050687 A1 | 5/2007 |
| EP | 0827918 A2 | 3/1998 |
| EP | 0827920 A2 | 3/1998 |
| EP | 0904242 B1 | 2/2000 |

OTHER PUBLICATIONS

China National Intellectual Property Administration, First Office Action and Search Report, Application No. 201710431980.4, dated Mar. 26, 2020, 19 pages.

* cited by examiner

CONVEYOR DEVICE FOR THE SUSPENDED CONVEYANCE OF CONVEYABLE GOODS BY MEANS OF NEGATIVE PRESSURE

CROSS-REFERENCE TO RELATED APPLICATIONS

This application claims priority to European Patent Application No. 16173993.3 filed on Jun. 10, 2016. The contents of this application are hereby incorporated by reference as if set forth in their entirety herein.

BACKGROUND

The invention at hand relates to a conveyor device for the suspended conveyance of conveyable goods realized in particular as tailored blanks by means of negative pressure, comprising at least one belt conveyor device comprising at least one continuous conveyor belt, which is guided along a negative-pressure chamber in such a manner that a rearward side of the conveyor belt facing towards the negative-pressure chamber is arranged opposite a chamber opening of the negative-pressure chamber and that a contact side of the conveyor belt is provided with suction openings formed between the rearward side and the contact side of the conveyor belt in order to form holding forces between the contact side of the conveyor belt and a contact side of the conveyable goods.

A device of the make mentioned above is known from EP 0 904 242 B1, in which the contact side of the conveyor belt is provided with a plurality of annular protrusions arranged in the longitudinal direction of the conveyor belt, said protrusions surrounding the suction openings formed in the conveyor belt. Individual holding chambers are formed between the contact sided of the conveyor belt and a contact side of the conveyable goods via the annular protrusions, said holding chambers enabling the conveyable goods to be pressurized with negative pressure.

There is a significant expenditure of energy in order to hold in particular heavy sheet metals by means of negative pressure in the known device since the surface, which is limited by the annular protrusions and through which the negative pressure can actually act on the contact side of the conveyor belt, is comparatively small so that a comparatively large pressure gradient is required for a safe conveyance.

Moreover, a high surface pressure between the annular protrusions and the contact side of the conveyable goods occurs due to the comparatively large pressure gradient. This leads to an undesired surface marking on the contact side, in particular with lubricated or oiled surfaces of the conveyable goods.

SUMMARY OF THE INVENTION

The task of the invention is to realize a device of the type mentioned above such that a safe conveyance of building components to be conveyed is possible by means of negative pressure using a comparatively small pressure gradient. In the device according to the invention, a recess limited by longitudinal edges of the conveyor belt and extending in the longitudinal direction of the conveyor belt is formed on the contact side of the conveyor belt in such a manner that a suction duct sealed by the longitudinal edges and arranged transversely to the longitudinal direction of the conveyor belt with respect to the contact side of the conveyable goods is formed between the contact side of the conveyor belt and the contact side of the conveyable goods.

The device according to the invention enables significantly increasing the holding forces acting on the conveyable goods by being able to omit forming individual and discrete holding chambers, which comprise protrusions formed individually to one another in the contact surface of the conveyor belt, and instead forming a suction duct continuously formed in the longitudinal direction of the conveyor belt between the contact side of the conveyor belt and the contact side of the conveyable goods, said suction duct being limited in its maximum length merely by the length of the conveyor belt.

Preferably, the recess is formed at least minimally larger than the length of the contact side of the conveyable goods so that supply air openings are formed at the axial ends of the suction duct, said supply air openings however not questioning the generation of a sufficient pressure gradient in the suction duct due to its small opening cross section in comparison to the surface of the recess.

It should be noted in particular that the conveyor device according to the invention enables forming the suction duct as a recess formed integrally in the conveyor belt so that the suction duct can be formed based on a standardly realized conveyor belt.

In its simplest embodiment, the recess required for forming the suction duct can be formed via a profiling of the belt cross section, said profiling being formed due to the suction force acting on the rearward side of the conveyor belt, in such a manner that the conveyor belt bulges under the influence of the suction force and that a cavity forms on the contact side of the conveyor belt due to said bulge. Likewise, the recess can be generated via a suitable material removal in the contact side of the conveyor belt. Preferably, this can be realized via an abrasive machining of the belt surface and by generating an accordingly formed groove in the belt surface.

It is particularly preferable if the recess in the contact side of the conveyor belt is formed as a groove-shaped material recess and extends over the entire length of the belt so that the entire length of the belt is accordingly available for forming suction ducts, each one formed between the contact sides of the conveyable goods and the contact side of the conveyor belt, the corresponding length of the suction duct being determined solely by the length of the contact sides of the conveyable goods.

If, according to a preferred embodiment, the chamber opening adjacent to the longitudinal edges of the conveyor belt is limited by each belt support extending in the longitudinal direction of the conveyor belt, said belt support serving as an abutting surface against the rearward side of the conveyor belt, the conveyor belt then serves not only for forming the suction duct but also for forming the negative-pressure chamber, whose pressure directly acts on the rearward side of the conveyor belt.

It is particularly advantageous if the rearward side of the conveyor belt is provided with a traction device formed in particular as a toothing in a middle area formed as a traction area, said rearward side comprising a level seal surface in the area of the longitudinal edges of the conveyor belt opposite the belt support so that an effective seal of the negative-pressure chamber is possible by means of the sealing pair formed by the belt support and the supporting edges.

It is particularly advantageous if a rearward support extending in the longitudinal direction of the conveyor belt is arranged in the chamber opening of the negative-pressure chamber in order to support the rearward side of the conveyor belt. The rearward support enables adjusting a defined height of the suction duct formed between the contact side of the conveyor belt and the contact side of the conveyable goods.

If an arrangement of the rearward support in the chamber opening can be altered for adjusting the depth of the recess of the carrying strap, it is possible to adjust the height of the suction duct to the adjustment of a desired channel profile if necessary.

In order to increase the holding forces generated by the negative pressure, the rearward support can be provided with a magnet device. Preferably, the magnet device can be formed as an integral part of the rearward support.

In a preferred embodiment, a retaining device extending in the longitudinal direction of the conveyor belt at least in sections and formed in particular as a holding rail is provided opposite each of the belt supports in such a manner that the longitudinal edges of the conveyor belt is received in guide grooves formed between the belt supports and the retaining device.

By this means it is prevented that the conveyor belt is lifted off of the belt supports due to an increase in pressure in the negative-pressure chamber when the conveyable goods are dropped from the conveyor belt.

If, in another embodiment, the negative-pressure chamber is provided with a negative-pressure conduit connected to a negative pressure generator in order to pressurize the negative-pressure chamber with negative pressure, a jet pump connected to a compressed-air chamber or a compressed-air generator via a switching valve being arranged in the negative-pressure conduit in such a manner that the negative-pressure chamber is pressurized with positive pressure via the negative-pressure conduit as triggered by the jet pump when the switching valve is actuated, the volume available in the negative-pressure conduit can then be used for pressurizing the negative-pressure chamber with positive pressure so that only a short pressure impulse introduced via the jet pump into the negative-pressure conduit is sufficient. The energy expenditure required for generating the positive pressure in order to drop the conveyable goods is therefore low.

In the following, a preferred embodiment of the invention is explained in more detail by way of illustration.

BRIEF DESCRIPTION OF THE DRAWINGS

In the figures.

DETAILED DESCRIPTION OF THE INVENTION

Figure 1:
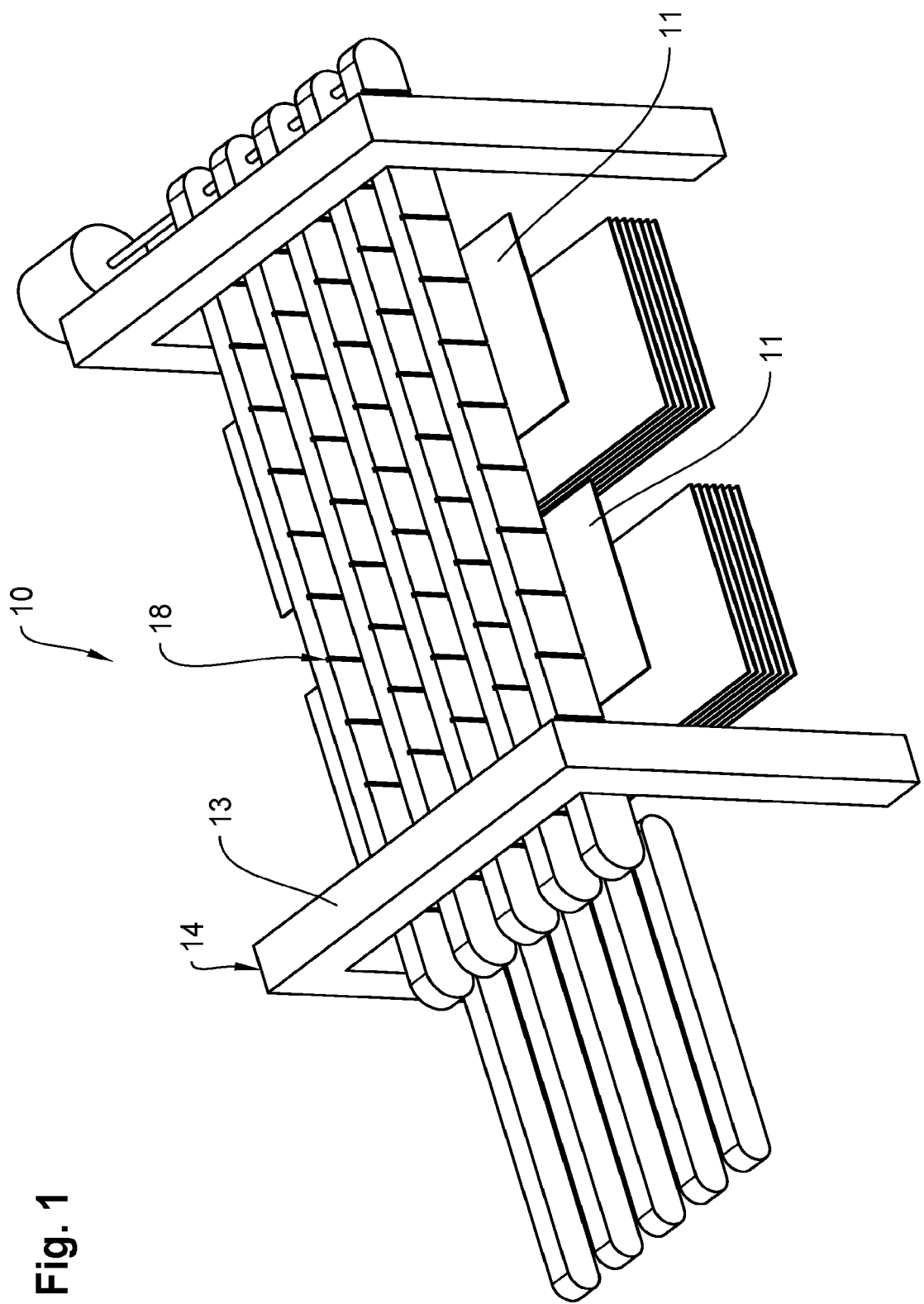
FIG. 1 shows a conveyor device having a plurality of belt conveyor legs.

In a schematic view, FIG. 1 shows a conveyor device 10 for the suspended conveyance of conveyable goods, which are realized as tailored blanks 11 in the present case. The conveyor device 10 comprises a plurality of belt conveyor legs 18 arranged parallel to each other, which are each arranged at traverses 13 of a support frame formed as a portal frame 14 and enable a horizontal conveyance of the tailored blanks 11 starting from a receiving end of the conveyor device to a drop position provided at the end of the conveyor device, said tailored blanks 11 being dropped from the belt conveyor legs 18 in the drop position.

Figure 2:
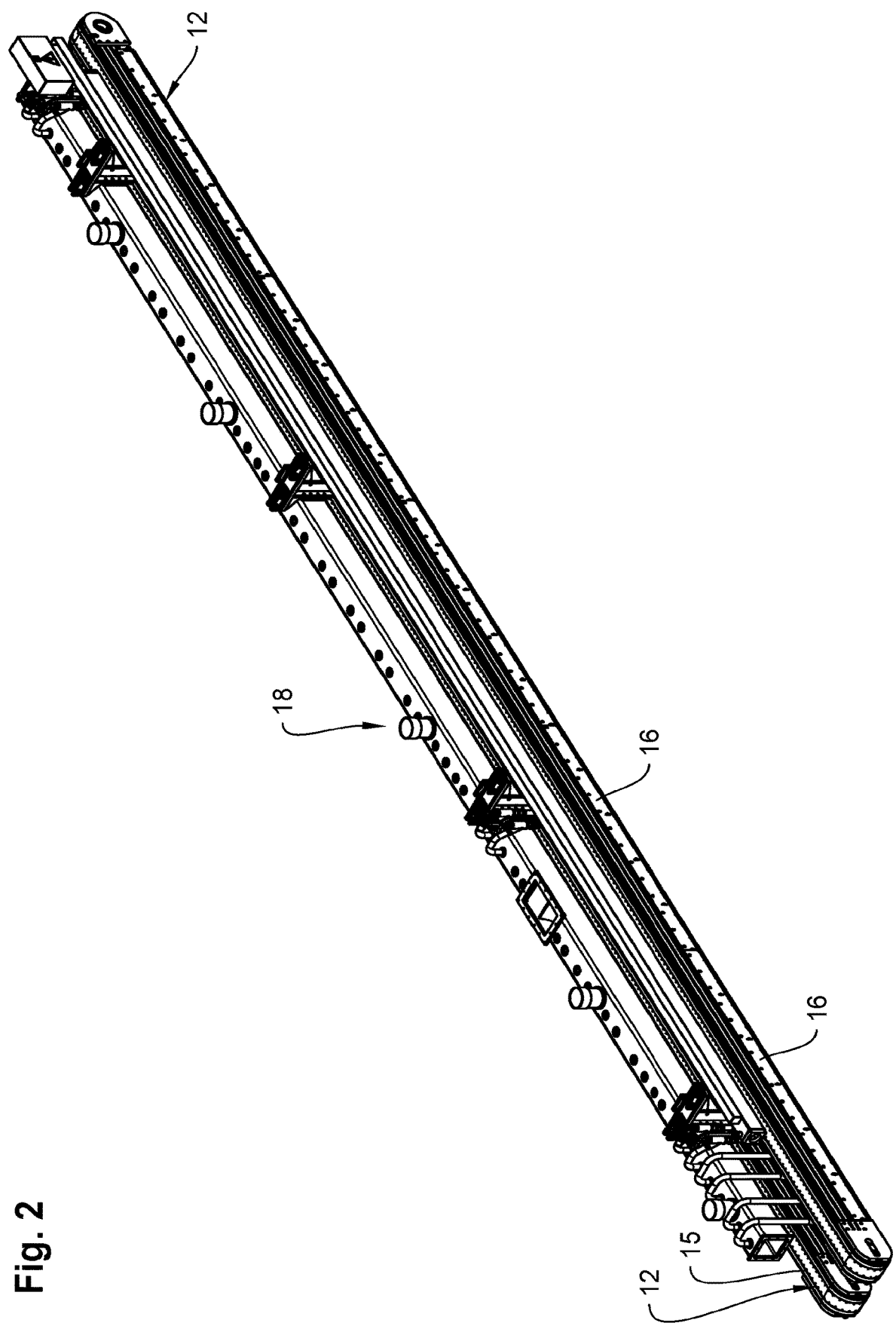
FIG. 2 shows a belt conveyor leg comprising two belt conveyor devices in an isometric display.

As can be seen in particular in FIG. 2 in the case of the shown embodiment, the belt conveyor legs 18 each comprise two belt conveyor devices 12 arranged parallel to each other. In order to convey the tailored blanks 11, the tailored blanks 11 are held to the conveyor belts 15 arranged continuously at the belt conveyor devices 12 by means of negative pressure. For this purpose, the conveyor belt devices 12 comprise negative-pressure chambers 16 arranged across the length of the belt conveyor device 12 in a row arrangement, negative-pressure conduits 17 being connected to said negative-pressure chambers 16 in sections in order to generate negative pressure, said negative-pressure conduits 17 being connected to a negative pressure generator 40 (FIG. 5) realized preferably as a radial fan.

Figure 3:
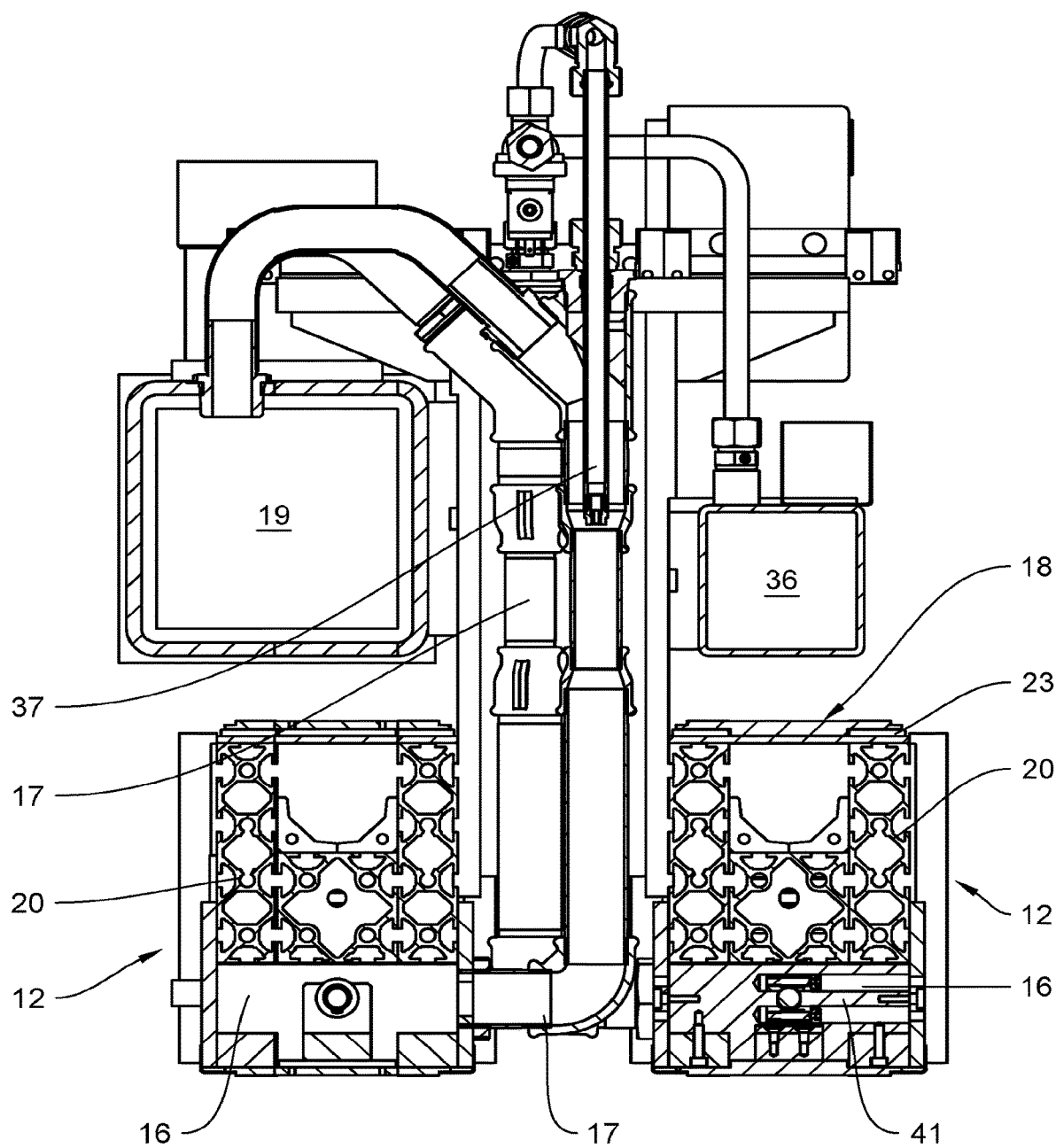
FIG. 3 shows the belt conveyor leg shown in FIG. 2 in a cross-sectional view.

As can be seen in FIG. 3 in the case of the embodiment at hand, two belt conveyor devices 12 are combined to form the belt conveyor leg 18 in each instance, the negative-pressure chamber 16 of the belt conveyor devices 12 being connected to the negative-pressure generator, not further shown here, via a vacuum chamber 19 connected to the negative-pressure conduits 17.

The belt conveyor devices 12 each comprise a support profile 20 extending horizontally, the negative-pressure chamber 16 being formed at the lower side of the support profile 20 in each instance.

Figure 4:
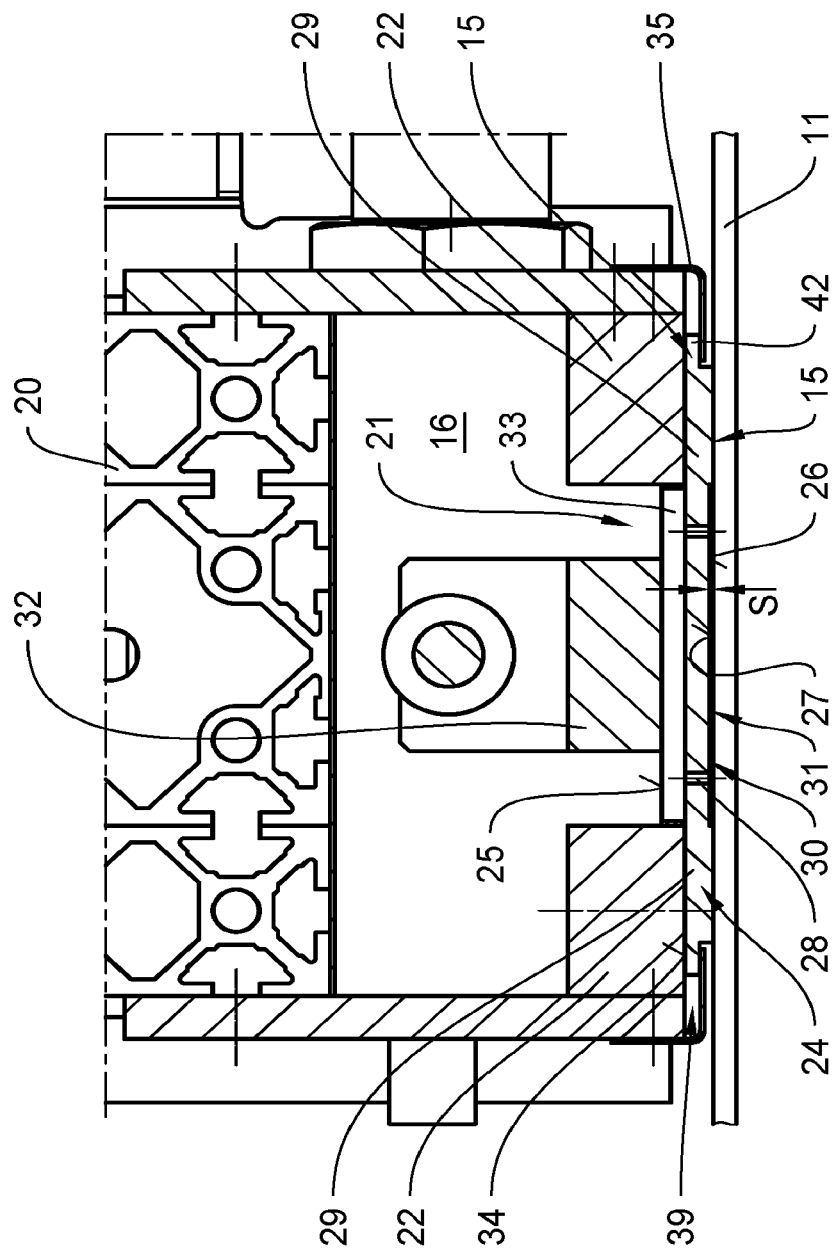
FIG. 4 shows an enlarged display of a negative-pressure chamber formed in a belt conveyor device.

As can be seen in particular in FIG. 4, the negative-pressure chambers 16 comprise a chamber opening 21, which is limited by belt supports 22 running parallel to the support profile 20. A belt guide 23 is provided on an upper side (FIG. 3) of the support profile 20 so that the support belt 15, as can be seen in a synopsis of FIGS. 2 and 3, is guided across deflection pulleys arranged at the ends of the support profiles 20 and along the belt supports 22 on the lower side of the support profile 20 as well as the belt guide 23 on the upper side of the support profile 20.

As can be seen in FIG. 4, the conveyor belt 15 is arranged between the negative-pressure chamber 16 and a tailored blank 11 using a lower belt strand 24 and forms a chamber wall of the negative-pressure chamber 16 using a rearward side 25 so that a fluid communication between the negative-pressure chamber 16 and a contact side 26 of the conveyor belt 15, with which the conveyor belt 15 rests against a contact side 27 of the tailored blank 11, takes place solely via a suction opening 28 formed in the conveyor belt 15.

A recess 30 limited laterally via longitudinal edges 29 of the conveyor belt 15 and extending in the longitudinal direction of the conveyor belt 15 is formed in the contact side 26 of the conveyor belt 15 in such a manner that a suction duct 31 covered by the tailored blank 11 is formed between the contact side 26 of the conveyor belt 15 and the contact side 27 of the tailored blank 11.

As FIG. 4 shows, a crevasse S is formed according to the depth of the recess 30 between the contact side 26 of the conveyor belt 15 and the contact side 27 of the tailored blank 11 via the recess 30 formed in the contact side 26 of the conveyor belt 15 in the area of the suction duct 31, said crevasse S ensuring that the suction openings 28 in the conveyor belt 15 are not covered due to the suction force acting on the contact side 27 of the conveyable goods and that consequently the holding forces required for holding the tailored blanks 11 can be formed due to the negative pressure. In order to influence the crevasse S, a rearward support 32 extending in the longitudinal direction of the conveyor belt 15 at least in sections is provided in the area of the chamber opening 21, said rearward support 32 resting against the conveyor belt 15. As in particular FIG. 3 shows, the rearward support 32 is provided with an adjusting device 41 realized as an eccentric device, for example, which enables a vertical infeed of the rearward support 32 towards the conveyor belt 15.

Deviating from the display in FIG. 4, the rearward support 32 can be provided with a magnet device, not shown here, in order to increase the holding forces generated by negative pressure.

The conveyor belt 15 is, as can be seen in particular in FIG. 4, provided with a traction device 33 formed as a toothing in this instance on its rearward side 25 solely in a middle area, which is formed between the longitudinal edges 29 of the conveyor belt 15, said traction device 33 enabling a transfer of a propelling force onto the conveyor belt 15. In the area of the longitudinal edges 29, the rearward side 25 comprises level seal surfaces 34, which rest against the belt supports 22 in a sealing manner due to the negative pressure acting on the rearward side 25.

A retaining device 35 extending in the longitudinal direction of the conveyor belt 15 at least in sections and realized as a holding rail in this instance is provided opposite each of the belt supports 22 so that guide crosspieces 42 formed at the longitudinal edges 29 are received in guide grooves 39, which are formed between the belt supports 22 and the retaining devices 35.

The retaining devices 35 serve in particular for preventing the longitudinal edges 39 from lifting too far off of the belt supports 22 when the negative-pressure chamber 16 is pressurized to support dropping the tailored blanks 11, which would otherwise delay the renewed build up of negative pressure in the negative-pressure chamber 16. As is shown in particular in FIG. 3, a compressed-air chamber 36 is provided at the belt conveyor leg 18 for dropping the tailored blanks 11 from the belt conveyor device 12, said compressed-air chamber 36 being connected to the negative-pressure conduit 17 via a jet pump 37.

Figure 5:
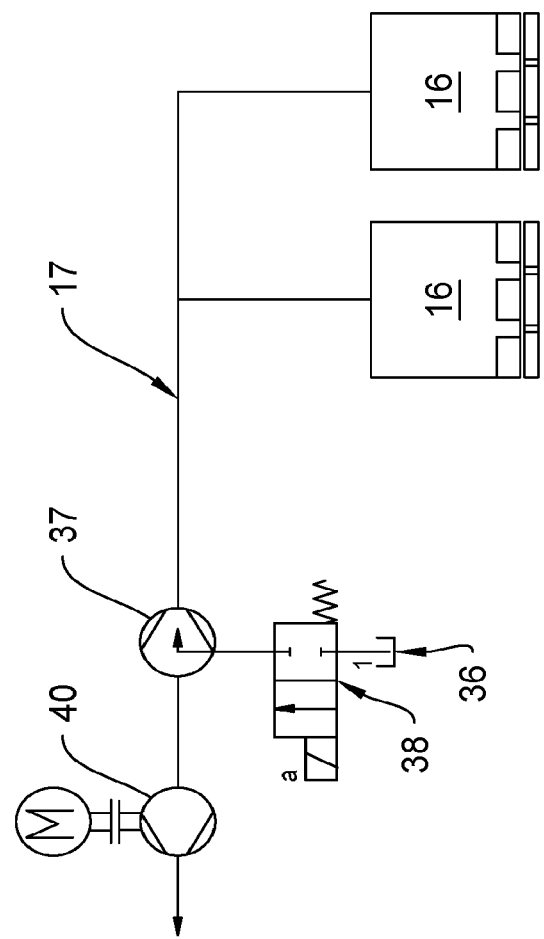
FIG. 5 shows a pressure connecting area of the negative-pressure chamber in a pneumatic circuit diagram.

As in particular the schematic view in FIG. 5 shows, the jet pump 37 arranged in the negative-pressure conduit 17 is connected to the compressed-air chamber 36 via a switching valve 38 so that a short pressurization takes place with compressed air via the jet pump 37 when the switching valve 38 is actuated and the volume contained in the negative-pressure conduit 17 is available for pressurizing the negative-pressure conduit 16 due to the ejection principle and a corresponding pressure impulse is able to be exerted on the rearward side 25 of the conveyor belt 15 and thus on the tailored blanks 11 via the suction openings 28 in the conveyor belt 15 so that they can be dropped.

The invention claimed is:

1. A conveyor device for the suspended conveyance of conveyable goods using negative pressure, comprising at least one belt conveyor device comprising at least one continuous conveyor belt, which is guided along a negative-pressure chamber in such a manner that a rearward side of the conveyor belt facing towards the negative-pressure chamber is arranged opposite a chamber opening of the negative-pressure chamber and that a contact side of the conveyor belt has a flat contact surface and is provided with suction openings formed between the rearward side and the contact side of the conveyor belt in order to form holding forces between the contact side of the conveyor belt and a contact side of the conveyable goods, wherein a recess extending in the longitudinal direction of the conveyor belt and limited by longitudinal edges of the conveyor belt is formed on the contact side of the conveyor belt in such a manner that a suction duct sealed by the longitudinal edges and arranged transversely to the longitudinal direction of the conveyor belt with respect to the contact side of the conveyable goods is formed between the contact side of the conveyor belt and the contact side of the conveyable goods, and wherein the recess is formed as a groove-shaped recess on the contact side of the conveyor belt and extends across the entire length of the belt, the recess being part of a unitary single-piece construction with the conveyor belt, and wherein the negative-pressure chamber is provided with a negative-pressure conduit connected to a negative-pressure generator for pressurizing the negative-pressure chamber with negative pressure, and a jet pump is connected to a compressed-air chamber or a compressed-air generator in the negative-pressure conduit via a switching valve in such a manner that the negative-pressure chamber is pressurized with positive pressure via the negative-pressure conduit as triggered by the jet pump when the switching valve is actuated.

2. The device according to claim 1, wherein adjacent to each of the longitudinal edges of the conveyor belt, the chamber opening is limited by a belt support extending in the longitudinal direction of the conveyor belt, said belt support serving as an abutting surface against the rearward side of the conveyor belt.

3. The device according to claim 2, wherein the rearward side of the conveyor belt is provided with a traction device, formed as toothing, in a middle section formed as a traction area, said rearward side comprising a level sealing surface in the area of the longitudinal edges of the conveyor belt opposite the belt support.

4. The device according to claim 1, wherein a rearward support extending in the longitudinal direction of the conveyor belt is arranged in the chamber opening in order to support the rearward side of the conveyor belt.

5. The device according to claim 4, wherein the arrangement of the rearward support in the chamber opening can be altered in order to adjust the depth of the recess.

6. The device according to claim 5, wherein the rearward support is provided with a magnet device.

7. The device according to claim 4, wherein the rearward support is provided with a magnet device.

8. The device according to claim 4, wherein the recess is formed as a groove-shaped material recess on the contact side of the conveyor belt and extends across the entire length of the belt.

9. The device according to claim 4 wherein adjacent to each of the longitudinal edges of the conveyor belt, the chamber opening is limited by a belt support extending in the longitudinal direction of the conveyor belt, said belt support serving as an abutting surface against the rearward side of the conveyor belt.

10. The device according to claim 9, wherein the rearward side of the conveyor belt is provided with a traction device, formed as toothing, in a middle section formed as a traction area, said rearward side comprising a level sealing surface in the area of the longitudinal edge of the conveyor belt opposite the belt support.

11. The device according to claim 1, wherein a retaining device extending in the longitudinal direction of the conveyor belt at least in sections and formed as a holding rail is provided opposite each of the belt supports in such a manner that each of the longitudinal edges of the conveyor belt is received in a guide groove formed between the belt support and the retaining device.

12. The device according to claim 11, wherein the recess is formed as a groove-shaped material recess on the contact side of the conveyor belt and extends across the entire length of the belt.

13. The device according to claim 11 wherein adjacent to each of the longitudinal edges of the conveyor belt, the chamber opening is limited by a belt support extending in the longitudinal direction of the conveyor belt, said belt support serving as an abutting surface against the rearward side of the conveyor belt.

14. The device according to claim 13, wherein the rearward side of the conveyor belt is provided with a traction device, formed as toothing, in a middle section formed as a traction area, said rearward side comprising a level sealing surface in the area of the longitudinal edges of the conveyor belt opposite the belt support.

15. The device according to claim 11 wherein a rearward support extending in the longitudinal direction of the conveyor belt is arranged in the chamber opening in order to support the rearward side of the conveyor belt.

16. The device according to claim 1, wherein adjacent to each of the longitudinal edges of the conveyor belt, the chamber opening is limited by a belt support extending in the longitudinal direction of the conveyor belt, said belt support serving as an abutting surface against the rearward side of the conveyor belt.

* * * * *